United States Patent
Chen et al.

(10) Patent No.: US 7,769,924 B2
(45) Date of Patent: Aug. 3, 2010

(54) METHOD AND SYSTEM FOR LOW LATENCY AUDIO-VISUAL TRANSPORT

(75) Inventors: Kenny Chen, Shanghai (CN); Brett Wang, Shanghai (CN); Ruijia Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 570 days.

(21) Appl. No.: 11/239,958

(22) Filed: Sep. 30, 2005

(65) Prior Publication Data

US 2007/0076737 A1    Apr. 5, 2007

(51) Int. Cl.
 *G06F 3/00* (2006.01)
 *G06F 5/00* (2006.01)
(52) U.S. Cl. .................................................. 710/52
(58) Field of Classification Search ............. 710/52
 See application file for complete search history.

(56) References Cited

U.S. PATENT DOCUMENTS

| | | | |
|---|---|---|---|
| 6,182,164 B1 * | 1/2001 | Williams | 710/15 |
| 6,683,986 B1 * | 1/2004 | Westerman | 382/232 |
| 7,216,186 B2 * | 5/2007 | Richardson | 710/53 |
| 2006/0288340 A1 * | 12/2006 | Raz | 717/168 |

* cited by examiner

*Primary Examiner*—Niketa I Patel
*Assistant Examiner*—Zachary K Huson
(74) *Attorney, Agent, or Firm*—Buckley, Maschoff & Talwalkar LLC

(57) ABSTRACT

A method and apparatus for low latency transport of signals. In some embodiments a method may include providing a buffer controller between two consecutive signal transmission processes between a host and a client to synchronize a write from a first of the two consecutive signal transmission processes and a read to a second of the of the two consecutive signal transmission processes, wherein the buffer controller includes a first buffer, a second buffer, and a first status list and a second status list that each provide an association status of the first buffer and the second buffer.

19 Claims, 4 Drawing Sheets

METHOD AND SYSTEM FOR LOW LATENCY AUDIO-VISUAL TRANSPORT

BACKGROUND OF THE INVENTION

In remote computing environments it may be desirable to transmit and process a signal such that data transmitted from a host or signal source is received and processed at a client or destination with relatively low latency in order to provide a realistic remote computing experience. For example, transmission and processing of an audio-visual (AV) signal from a host to a client with low latency may be desirable in order to have the AV signal appear at the host in "real-time". Real-time remote computing may contribute to a better experience of, for example, video playback and game play.

However, a number of techniques, methods, and systems for rendering signals, including AV signals, may not render the signals at a client from a host in real-time. Limitations of such techniques, methods, and systems may be due to, at least in part, a latency between the time an AV is rendered at a host and the time the AV signal is rendered at a client. The client may be located remotely from the host.

Thus, a need for an efficient method and system of transporting AV signals exists.

DETAILED DESCRIPTION

Figure 1:
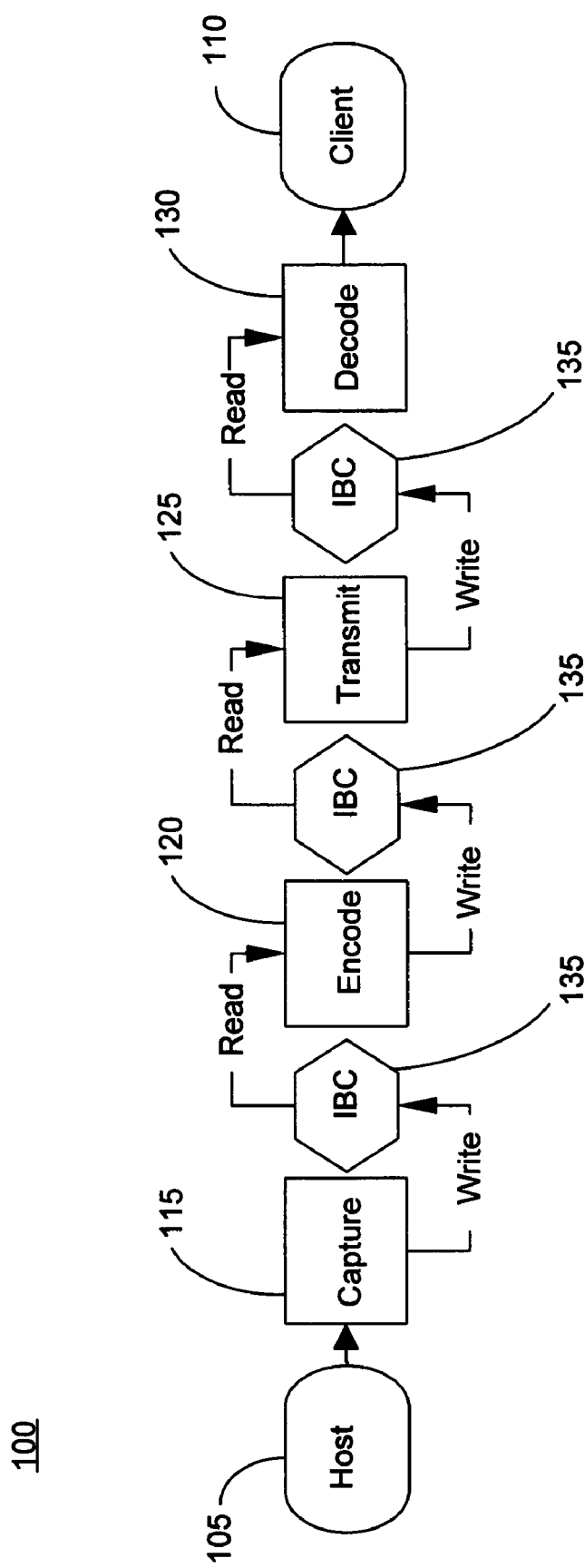
FIG. 1 is an exemplary illustration of a transport process, in accordance with some embodiments herein.

FIG. 1 is an exemplary illustration of a transport process 100, in accordance with some embodiments herein. Process 100 includes a transmission of a data signal from a host 105 to a client 110. In some embodiments, host 105 may include a computer, server, signal generator, or other signal source. In some embodiments, such as a remote gaming stack, host 105 captures AV signals from a game at process 115 and encodes the AV signals at process 120. The AV signals are transmitted toward client 110 at process 125.

In some embodiments, the AV signals are transmitted from host 105 to client 110 over a network. In accordance with other aspects of the present disclosure, the transmission network may vary. In some embodiments the network may include a local area network (LAN), a wide area network, (WAN), the internet, broadband cable, and other types of networks. At least portions of a network used for the transmission of AV signals herein may use wired communication paths and other portions of the network may use wireless communication paths.

In some embodiments, the communication path for the transport of the AV signal at process 125 may include Wi-Fi®, Bluetooth®, wireless telephone communication links, and other wireless communication formats and protocols.

Client 110 may decode the AV signals at process 130. Decoding 130 may include conditioning (e.g., filtering, amplifying, etc.), converting, and otherwise preparing the AV signals for processing by client 110. Client 110 may present the AV signals on a display device and an audio playback device. In some embodiments, client 110 may include a television, a display monitor, and a variety of audio playback devices to present the AV signals.

In some embodiments, including remote computing contexts such as, for example, remote gaming, the time between rendering the AV signals at host 105 and the time the AV signals are rendered at the client 110 may be referred to as latency. In particular, a system latency (SL) may refer to the time difference of the time an AV signal is rendered (i.e., displayed on a display device) on client 110 side and the time the AV signal is rendered (i.e., generated for display by a PC) on host 105 side. The SL may be expressed as follows:

$$SL=AVInClient-AVInHost \quad (1)$$

The time cost of every step of the transport process (e.g., operations 115, 120, 125, and 130) is referred to herein as internal latency (IL) of the transport process. The IL may comprise two types of IL, a constant IL (CIL) and an accumulative IL (AIL). CIL is the latency having an average time that is determinate. For example, CIL due to a network transmission time may be determinate based on a given network bandwidth. AIL is a latency component that occurs at a specific time but increases subsequent system latencies. The AIL propagates additional delays in subsequent processes. That is, the AIL impacts later aspects of the SL. Fluctuations to CIL that persist and additionally impact subsequent SL may be referred to as AIL. For example, in an instance a decrease in network bandwidth causes a longer transmission time, the additional time may introduce additional latencies that influence the SL. The additional latency is referred to as AIL. Accordingly, the SL may be expressed as follows:

$$CIL=CaptureTime+EncodeTime+TransmitTime+DecodeTime \quad (2)$$

$$SL=CaptureTime+EncodeTime+TransmitTime+DecodeTime+AIL \quad (3)$$

In accordance with some embodiments herein, SL may be minimized by reducing or even eliminating the AIL component thereof. In accordance therewith, FIG. 1 includes a number of devices 135 located between two consecutive processes of transport process 100. Devices 135 may be referred to as iterating buffer controllers (IBC). IBCs 135 are between each two consecutive the transport processes. That is, an IBC 135 is placed between capture 115 and encode 120 processes, between encode 120 and transmit 125 processes, and between transmit 125 and 130 processes.

In some embodiments, an IBC 135 is placed between each two consecutive transmission processes of transport process 100 to reduce the AIL component of SL at later processes. In some embodiments, an IBC 135 may be selectively placed between less than all of the pairs of two consecutive transmission processes. The placement of IBCs 135 may be based, at least in part in some embodiments, on a number of criteria, including the likelihood of AIL being introduced into a transport process and/or where it will be introduced.

In some embodiments herein, IBC 135 includes two internal buffers and two status lists. The two buffers are provided to store data. The two status list are provided to provide an indication of an association of the buffers. The two buffers may be, for example, a Buffer A and a Buffer B. The two status list may be, for example, a ValidList and an InvalidList. Therefore, each of the status list, ValidList and InvalidList, may include an indication of Buffer A and/or Buffer B, if either buffer at all.

IBC 135 provides synchronized read and write functionalities in an effort to reduce or even eliminate SL due to AIL. In some aspects, the IBC may provide an intermediate store station.

Figure 2:
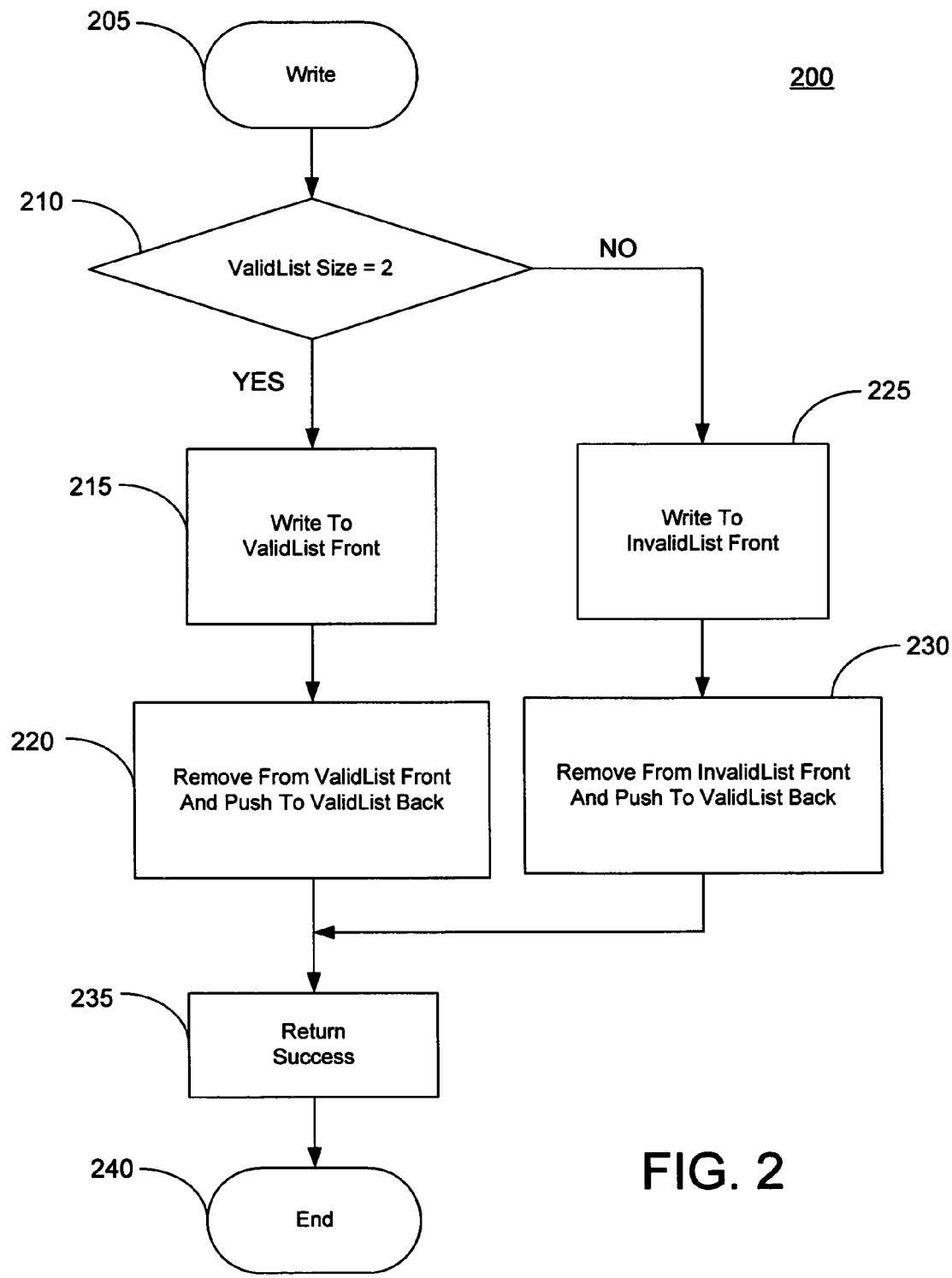
FIG. 2 is an exemplary flow diagram of a process, in accordance with some embodiments herein.

FIG. 2 is an exemplary flow diagram of a WRITE process 200 for IBC 135, in accordance with some embodiments herein. The IBC's write functionality operates to write data to override either (1) older valid data of the two IBC buffers or (2) invalid data of an IBC buffer. Write process 200 is invoked to write data from a first of two consecutive signal transmission processes (e.g., capture 115) to IBC 135 that is located between, for example, capture process 115 and encode process 120. Write process 200 begins at operation 205. A determination of a size of the ValidList status list is made at operation 210. In an instance the ValidList status list is associated with both of the IBC buffers (i.e., ValidList size=2), then write process 200 proceeds to operation 215. At operation 215, data from the first of the two consecutive signal transmission processes interfaced with by IBC 135 (e.g., capture process 115 regarding consecutive processes capture process 115 and encode process 120) is written to a front location of the ValidList status list.

It is noted that the status list herein may have two locations (e.g., a front and a back) location to accommodate the two IBC buffers.

At operation 220, the data is removed from the front location of the ValidList status list and placed in the back location of the ValidList status list. In this manner, the data of the older of the two buffers associated with the ValidList status list is replaced with the data from the first of the two consecutive signal transmission processes interfaced with by IBC 135.

Referring back to the determination of operation 210, in an instance the ValidList is not associated with both of the IBC buffers, then write process 200 proceeds to operation 225. At operation 225, data from the first of the two consecutive signal transmission processes interfaced with by IBC 135 is written to a front location of the InvalidList status list.

At operation 230, the data is removed from the front location of the InvalidList status list and placed in the back location of the ValidList status list. In this manner, the data associated with the InvalidList status list is replaced with the data from the first of the two consecutive signal transmission processes interfaced with by IBC 135.

At operation 235, in some embodiments, an indication of a successful write process is provided. The return of the success indicator may conclude write process 200, as indicated at 240.

Figure 3:
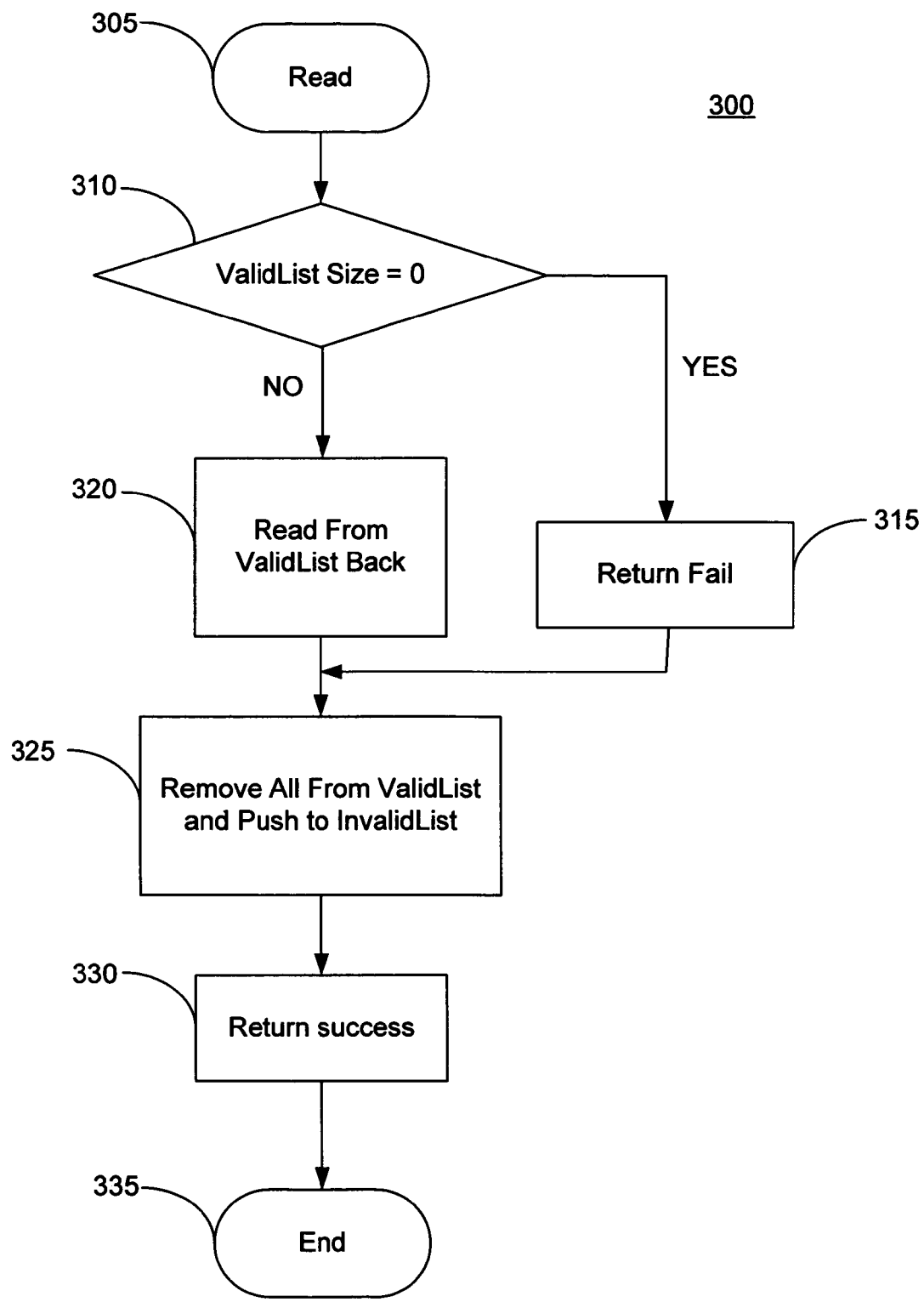
FIG. 3 is an exemplary flow diagram of a process, in accordance with some embodiments herein.

FIG. 3 is an exemplary flow diagram of a READ process 300 for the IBC, in accordance with some embodiments herein. The IBC's read functionality operates to provide either (1) the newer valid data from the two IBC buffers or (2) a NULL if both of the IBC buffers are invalid. Read process 300 is invoked to read data to a second of two consecutive signal transmission processes (e.g., encode 120) from IBC 135 that is located between, for example, capture process 115 and encode process 120. Write process 300 begins at operation 305. A determination of whether the ValidList status list has a buffer associated therewith is made at operation 310. In an instance the ValidList is associated with one or both of the IBC buffers (i.e., ValidList size≠0), then read process 300 proceeds to operation 320. At operation 320, data from IBC 135 is read to the second of the two consecutive signal transmission processes interfaced with the IBC (e.g., encode process 120 regarding consecutive processes capture process 115 and encode process 120) from a back location of the ValidList status list.

Referring back to the determination at operation 310, in an instance the ValidList status is not associated with either of the IBC buffers, then read process 300 proceeds to operation 315. At operation 315, a fail indicator is returned (e.g., a NULL). In this instance, no data is read is read to the second of the two consecutive signal transmission processes interfaced with by IBC 135 (e.g., encode process 120 regarding consecutive processes capture process 115 and encode process 120) from IBC 135.

At operation 325, all indications of a buffer association are removed from the ValidList status list and moved to the InvalidList status list. In this way, the ValidList status list is cleared.

At operation 330, in some embodiments, an indication of a successful read process is provided. The return of the success indicator may conclude read process 300, as indicated at 335.

Write process 200 and read process 300 cooperate to synchronize write and read operations between two consecutive signal transmission processes. Write and read two processes 200 and 300 operate to provide the second process of two consecutive signal transmission processes with the newest data from the first process of the two consecutive signal transmission processes. In this manner, the newer data may override older data in an instance AIL occurs between the host and the client.

It is noted that a disregard of the older data may be viewed as the equivalent of the older data being transmitted with zero SL (i.e., negative AIL) that counteracts a current AIL. Thus, the AIL of a data signal transmission may be reduced (or even eliminated).

In some embodiments, the signal transmission processes may be performed independently and/or in parallel. For example, the processes 115, 120, 125, and 130 may operate independently of each other such as in multithreading, hyperthreading, and dual-core (e.g., multi-core) processing environments. Such parallel processing may be facilitated by the IBC and the associated write and read functionalities thereof that operate to synchronize data transmission and reduce latencies attributable to AIL.

Figure 4:
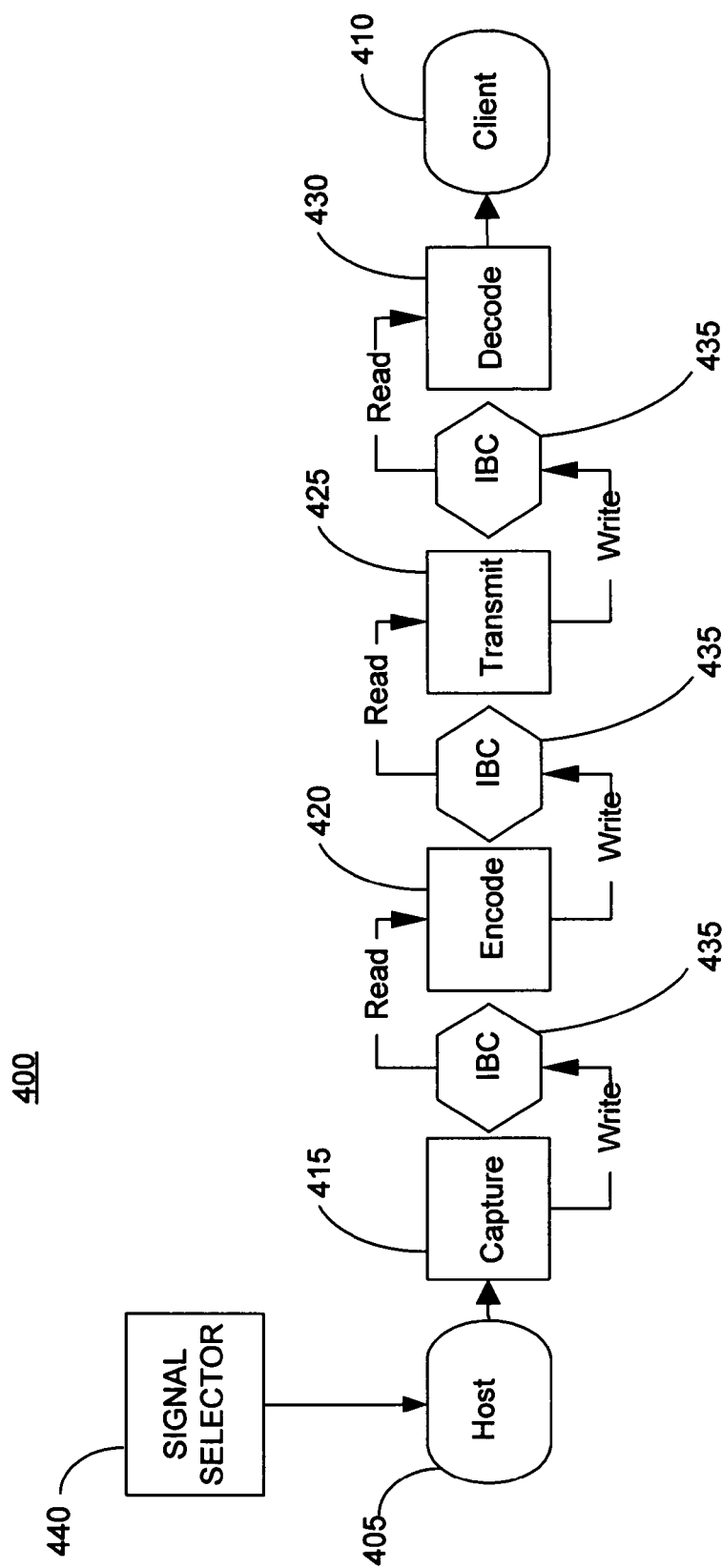
FIG. 4 is an exemplary block diagram of a system, in accordance with some embodiments herein.

FIG. 4 is an exemplary illustrative diagram of a system 400, in accordance with some embodiments herein. System 400 may be similar to the transport process arrangement of FIG. 1. In particular, the exemplary signal processes of FIG. 1 and FIG. 4 may operate in a similar manner. Thus, a detailed discussion of the signal transport processes of FIG. 4 may be understood by referencing the discussion of FIG. 1 hereinabove.

One of the distinctions of FIG. 4 includes signal selector 440. Signal selector is shown in communication with host 405. Signal selector 440 may communicate with host 405 on a less than full-time basis. For example, signal selector 440 may communicate with host 405 on an as-needed basis, such as whenever a change of the data signal from host 405 is desired. Control of signal selector 440 may be provided by host 405, client 410, or other devices and control mechanisms.

IBCs 435 in system 400 operate to provide synchronized read and write functionalities to reduce, or even eliminate, SL due to AIL between host 405 and client 410. The functionality provided by IBCs 435 is similar to the functionality provided by IBCs 135 discussed in detail above, including the write and read functionalities. Thus, an understanding of the operation of IBCs 435 may be had by referencing the discussion of IBCs 135 herein.

In some embodiments, such as a remote gaming environment, signal selector 440 may be implemented in a set-top device at a client end location. In some embodiments, the location and the types of signals controlled by the signal selector may vary.

In some embodiments, instructions that when executed by a machine perform methods discussed in conjunction with some of the embodiments herein may be embodied in an article of manufacture. The article of manufacture may include a CD-ROM, fixed or removable storage mechanisms, random access memory (RAM), read only memory (ROM), flash memory, and other data storage and data delivery mechanisms.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method comprising:
   providing a buffer controller between two consecutive signal transmission processes between a host and a client to synchronize a write from a first of the two consecutive signal transmission processes and a read to a second of the of the two consecutive signal transmission processes, wherein the buffer controller includes a first buffer, a second buffer, and a first status list and a second status list, each of the first status list and the second status list having two locations to provide an indication of whether the first buffer and the second buffer is associated with the first status list and the second status list;
   writing data from the first process to the buffer controller, in an instance both the first and second buffers are associated with the first status list as indicated by the first status list, to replace an older of the first buffer and the second buffer associated with the first status list;
   writing data from the first process to the second status list of the buffer controller in an instance both the first and second buffers are not indicated as being associated with the first status list as indicated by the first status list; and
   reading data to the second process from the newer of the first and second buffers associated with the first status list in an instance the first status list includes an indication that at least one of the first and second buffers are associated with the first status list, otherwise do not read any data to the second process from the buffer controller in an instance the first status list does not include an indication that at least one of the first and second buffers are associated with the first status list.

2. The method of claim 1, wherein the writing operations receive data from the first of the two consecutive signal transmission processes and the reading operation reads data to the second of the two consecutive signal transmission processes.

3. The method of claim 1, wherein the writing and reading operate to reduce an accumulative latency between the host and the client.

4. The method of claim 1, wherein the reading and the writing are performed by the buffer controller.

5. The method of claim 1, wherein the two consecutive signal transmission processes operate in parallel.

6. The method of claim 1, wherein the buffer controller is provided between each two consecutive signal transmission processes between the host and the client to provide the reading and the writing.

7. The method of claim 1, wherein a signal transmitted between the host and the client is at least one of a digital signal, an audio signal, a video signal, and any combinations thereof.

8. An apparatus comprising:
   a first buffer;
   a second buffer;
   a first status list to provide an indication of an association status of the first buffer and the second buffer with the first status list; and
   a second status list to provide an indication of an association status thereof with the first buffer and the second buffer with the second status list,
   wherein the apparatus is operative to:
      write data from a first of two consecutive signal transmission processes, in an instance both the first and second buffers are indicated as being associated with the first status list, to replace an older of the first buffer and the second buffer associated with the first status list;
      write data from the first process to the second status list in an instance both the first and second buffers are not indicated as being associated with the first status list; and
      read data to a second of the two consecutive signal transmission processes from the newer of the first and second buffers associated with the first status list in an instance the first status list includes as indication that at least one of the first and second buffers are associated with the first status list, otherwise not reading any data to the second process from the buffer controller in an instance the first status list does not include an indication that at least one of the first and second buffers are associated with the first status list.

9. The apparatus of claim 8, wherein the writing operations receive data from the first of the two consecutive signal transmission processes and the reading operation reads data to the second of the two consecutive signal transmission processes.

10. The apparatus of claim 8, wherein the writing and reading operate to reduce an accumulative latency between the host and the client.

11. The apparatus of claim 8, wherein the reading and the writing are performed by a controller.

12. The apparatus of claim 8, wherein the two consecutive signal transmission processes operate in parallel.

13. The apparatus of claim 8, wherein a signal transmitted between the host and the client is at least one of a digital signal, an audio signal, a video signal, and any combinations thereof.

14. A storage medium having executable programming instructions stored thereon, the stored program instructions comprising:
   instructions to write data from a first of two consecutive signal transmission processes, in an instance both a first and a second buffer are indicated as being associated with the first status list, to replace an older of the first buffer and the second buffer associated with the first status list;
   instructions to write data from the first process to the second status list in an instance both the first and second buffers are not indicated as being associated with the first status list; and
   instructions to read data to a second of the two consecutive signal transmission processes from the newer of the first and second buffers associated with the first status list in an instance the first status list includes an indication that at least one of the first and second buffers are associated with the first status list, otherwise do not read any data to the second process from the buffer controller in an instance the first status list does not include an indication that at least one of the first and second buffers are associated with the first status list.

15. The medium of claim 14, wherein the writing and reading operate to reduce an accumulative latency between the host and the client.

16. The medium of claim 14, wherein the two consecutive signal transmission processes operate in parallel.

17. A system comprising:
a buffer controller located between two consecutive signal transmission processes between a host and a client, wherein the buffer controller includes a first buffer, a second buffer, and a first status list and a second status list that each provide an association status of the first buffer and the second buffer; wherein the buffer controller is operative to:
write data from the first process, in an instance both the first and second buffers are indicated as being associated with the first status list, to replace an older of the first buffer and the second buffer associated with the first status list;
write data from the first process to the second status list in an instance both the first and second buffers are not indicated as being associated with the first status list; and
read data to the second process from the newer of the first and second buffers associated with the first status list in an instance the first status list includes an indication that at least one of the first and second buffers are associated with the first status list, otherwise do not read any data to the second process from the buffer controller in an instance the first status list does not include an indication that at least one of the first and second buffers are associated with the first status list; and
a signal selector to provide a signal to the buffer controller.

18. The system of claim 17, wherein the writing and reading operate to reduce an accumulative latency between the host and the client.

19. The system of claim 17, wherein the buffer controller is provided between each two consecutive signal transmission processes between the host and the client to provide the reading and the writing.

* * * * *